United States Patent
Cattoor et al.

(10) Patent No.: US 12,449,021 B1
(45) Date of Patent: Oct. 21, 2025

(54) WET CLUTCH POWERSHIFT WITH RANGE SHIFT

(71) Applicant: Dana Belgium N.V., Flanders (BE)

(72) Inventors: Kurt Cattoor, Koolkerke (BE); Filip D. Schacht, Meulebeke (BE); Filip Van Raepenbusch, Bruges (BE); Stijn Goossens, Erpe-Mere (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/680,382

(22) Filed: May 31, 2024

(51) Int. Cl.
*F16H 3/00* (2006.01)
*B60K 1/02* (2006.01)
*F16H 3/093* (2006.01)
*B60K 17/28* (2006.01)

(52) U.S. Cl.
CPC ............... *F16H 3/006* (2013.01); *B60K 1/02* (2013.01); *F16H 3/093* (2013.01); *B60K 17/28* (2013.01); *F16H 2003/008* (2013.01)

(58) Field of Classification Search
CPC .... F16H 3/006; F16H 3/093; F16H 2003/008; B60K 1/02
See application file for complete search history.

(56) References Cited

U.S. PATENT DOCUMENTS

| | | | |
|---|---|---|---|
| 7,798,931 | B2 | 9/2010 | Earhart |
| 11,247,563 | B2 | 2/2022 | Van Dingenen et al. |
| 11,312,218 | B2 | 4/2022 | Serrao et al. |
| 11,655,863 | B1 | 5/2023 | Versini et al. |
| 11,738,639 | B2 | 8/2023 | Marechal et al. |
| 11,796,039 | B2 * | 10/2023 | Hannon ................... F16H 3/727 |
| 11,807,094 | B1 * | 11/2023 | Cattoor ............... F16H 37/0826 |
| 11,982,348 | B2 * | 5/2024 | Schacht ............... F16H 61/0403 |
| 2019/0315220 | A1 * | 10/2019 | Liu ......................... B60K 6/547 |
| 2023/0009105 | A1 * | 1/2023 | Kwon ....................... B60K 6/48 |
| 2023/0167888 | A1 | 6/2023 | Li et al. |
| 2023/0322063 | A1 * | 10/2023 | Van Dingenen ....... B60K 25/06 74/661 |

FOREIGN PATENT DOCUMENTS

| | | | | |
|---|---|---|---|---|
| CN | 101169175 | A | 4/2008 | |
| CN | 114165563 | A * | 3/2022 | |
| CN | 116336144 | A * | 6/2023 | ............... B60K 6/36 |

(Continued)

OTHER PUBLICATIONS

Cattoor, K. et al., "Systems and Method for an Electric Powertrain," U.S. Appl. No. 18/640,656, filed Apr. 19, 2024, 19 pages.

*Primary Examiner* — Bobby Rushing, Jr.
(74) *Attorney, Agent, or Firm* — McCoy Russell LLP

(57) ABSTRACT

Systems and methods for transmission systems for electric vehicles are provided. In one example, a transmission system is provided that comprises an input shaft rotationally coupled with a first electric motor and a second electric motor, the input shaft having a second clutch; an intermediate shaft having a first clutch and a mechanical clutch system, where the intermediate shaft is selectively coupled to the input shaft via the second clutch or via the first clutch; an idler shaft selectively coupled to the intermediate shaft via a low output of the mechanical clutch system or via a high output of the mechanical clutch system; and an output shaft rotationally coupled with the idler shaft.

16 Claims, 7 Drawing Sheets

(56) References Cited

FOREIGN PATENT DOCUMENTS

| | | | | |
|---|---|---|---|---|
| DE | 102011084623 | A1 | 4/2013 | |
| DE | 102015010331 | A1 * | 2/2017 | |
| DE | 202023105374 | U1 * | 2/2024 | ............... B60K 1/00 |
| KR | 101610506 | B1 | 4/2016 | |
| WO | 2020078596 | A1 | 4/2020 | |
| WO | WO-2023051513 | A1 * | 4/2023 | ............... B60K 6/36 |

* cited by examiner

WET CLUTCH POWERSHIFT WITH RANGE SHIFT

TECHNICAL FIELD

The present disclosure relates to transmission systems for electric vehicles.

BACKGROUND AND SUMMARY

Vehicles may include a transmission for a controlling power generated by an engine and/or motors in electric and/or hybrid electric applications. The transmission may include one or more shafts and gears that may engage or disengage with one another based on selected gear ratios. Multi-speed power-shift transmissions of the countershaft type may have friction and associated gears operatively assembled on a speed clutch shaft, for example.

The inventors have recognized various issues with such transmission systems when applied to a variety of different road and vehicle operating conditions. For example, the vehicle tractive effort in a first gear may be very demanding in severe environmental conditions, e.g., mud, steep slopes and the like. If the high tractive effort in first gear is not needed to start moving the vehicle one can start with the transmission in second gear depending on a driver's choice and the controller settings, for example. It may be desirable to have an electrified transmission where a shifting from a first to second gear does not interrupt torque and a shifting from the second to a third gear interrupts torque.

In order to address these and other issues, in one example approach a transmission system is provided that comprises an input shaft rotationally coupled with a first electric motor and a second electric motor, the input shaft having a second clutch; an intermediate shaft having a first clutch and a mechanical clutch system, where the intermediate shaft is selectively coupled to the input shaft via the second clutch or via the first clutch; an idler shaft selectively coupled to the intermediate shaft via a low output of the mechanical clutch system or via a high output of the mechanical clutch system; and an output shaft rotationally coupled with the idler shaft. In some examples, the transmission system may further comprise a third electric motor selectively coupled to the input shaft or to a power takeoff output via a mechanical clutch system.

Such an approach may provide shifting functionality from a first to second gear without torque interruption and shifting from second to third gear may done via a mechanical clutch system and will cause a torque interruption. Such an approach may provide an electrified transmission for a variety of off and on highway applications or other various road and/or vehicle operating conditions. The combination of a wet clutch powershift and mechanical clutch system shift may result in a more efficient and cost effective transmission while delivering desired transmission performance under a variety of conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
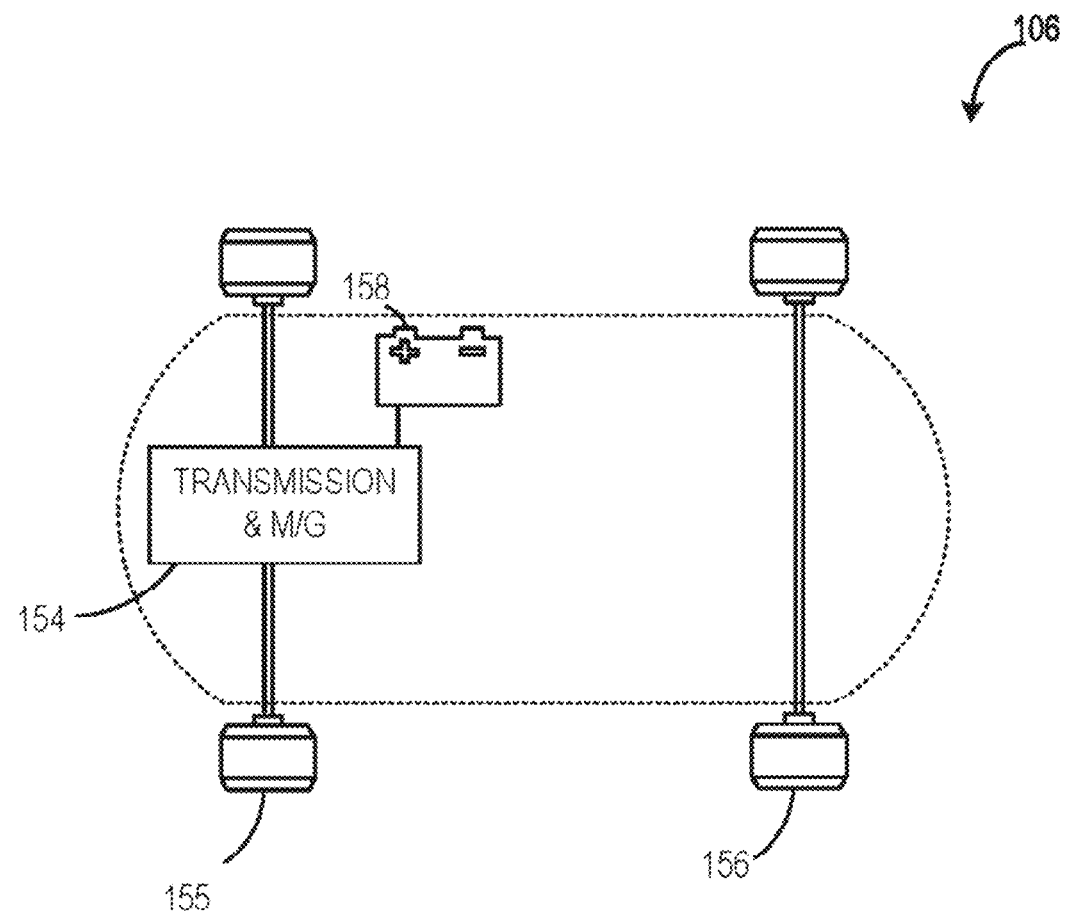
FIG. 1 shows a schematic of an example vehicle in accordance with the disclosure.
Figure 1:
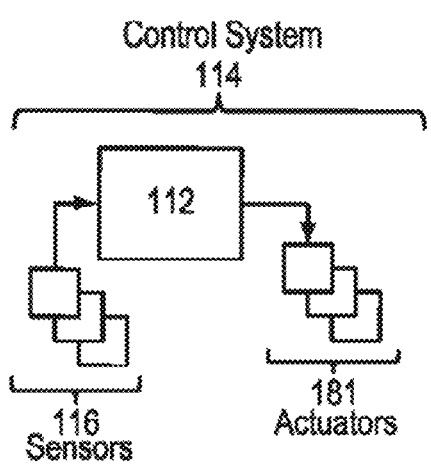
Figure 2:
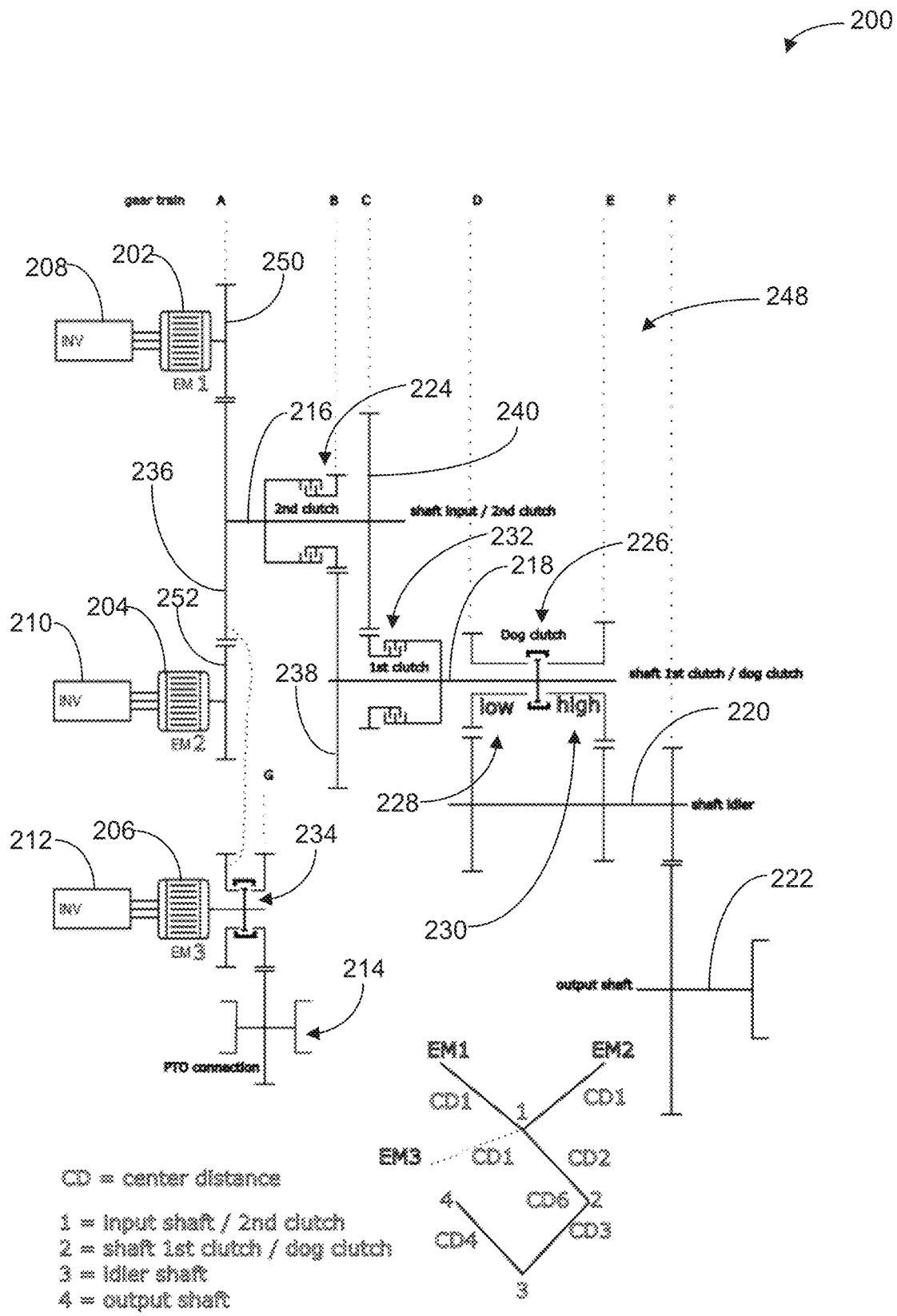
FIG. 2 shows an example transmission layout system for an electric vehicle in accordance with the disclosure.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to the figures, FIG. 1 shows a schematic depiction of a vehicle system 106 that can derive propulsion power from an electric motor 154 (e.g., a drive motor). Though FIG. 1 shows a single electric motor 154, it should be understood that vehicle system 106 may include any suitable number of electric motors to propel the vehicle and/or provide power to various components and systems within system 106. For example, vehicle system may include three electric motors that input into a transmission system, as described below. In some examples, electric motor 154 may be a traction motor, however other types of electric motors are contemplated. Electric motor 154 may receive electrical power from a traction battery 158 to provide torque to rear vehicle wheels 155. Electric motor 154 may also be operated as a generator to provide electrical power to charge traction battery 158, for example, during a braking operation. It should be appreciated that while FIG. 1 depicts an electric motor 154 mounted in a rear wheel drive configuration, other configurations are possible, such as employing electric motor 154 in a front wheel configuration, or in a configuration in which there is an electric motor mounted to both the rear vehicle wheels 155 and front vehicle wheels 156. Further, additional electric motors may be included in system 106 for other purposes as described in the examples below.

Electric motor 154 may include a gearbox integrated therein and/or may provide input power, together with other electric motors, to a transmission system, examples of which are described below. Additionally, or alternatively, the electric motor 154 may be coupled to an outside of a transmission/gearbox housing. The integrated gearbox may include one or more input speed reduction gear sets. Electric motor 154 may also include at least one clutch. Controller 112 may send a signal to an actuator of the clutch(es) to engage or disengage the clutch(es), so as to couple or decouple power transmission from the electric motor 154 to the rear vehicle wheels 155 or the front vehicle wheels 156. Additionally, or alternatively, there may be multiple traction batteries configured to provide power to different driven wheels, wherein power to the wheels may be predicated based on traction at the wheels, driver demand, and other conditions.

Controller 112 may form a portion of a control system 114. Control system 114 is shown receiving information from a plurality of sensors 116 and sending control signals to a plurality of actuators 181. As one example, sensors 116 may include sensors such as a battery level sensor, clutch activation sensor, etc. As another example, the actuators may include the clutch, etc. The controller 112 may receive input data from the various sensors, process the input data, and trigger the actuators in response to the processed input data based on instruction or code programmed therein corresponding to one or more routines.

FIG. 2 shows an example transmission layout system 200 for an electric vehicle according to the present disclosure. Transmission layout 200 comprises a driveline 248 having three electric motors including a first electric motor 202, a second electric motor 204, and a third electric motor 206. In some examples, the electric motors may be traction motor-generators, however other suitable types of electric motors are contemplated. The first electric motor 202 may be controlled by a first inverter controller 208. The second electric motor 204 may be controlled by a second inverter controller 210. The third electric motor 206 may be controlled by a third inverter controller 212.

The first electric motor 202 and the second electric motor 204 may be rotationally coupled via a gearwheel 236 to an input shaft 216. For example, gearwheel 236 may be meshed with the first and second motors. As used herein, the term "meshed" is intended to mean two gearwheels or the like rotationally coupled to each other. For example, a gearwheel 250 rotationally coupled to electric motor 202 may be meshed with gearwheel 236 coupled to input shaft 216. Likewise, a gearwheel 252 rotationally coupled to electric motor 204 may be meshed with gearwheel 236 coupled to input shaft 216.

The input shaft 216 further comprises a second wet clutch 224. As used herein, the phrase "wet clutch" is intended to mean a clutch in which the friction material of the clutch sits in an oil bath or has flow-through oil that may cool and lubricate the clutch. The second wet clutch 224 may be configured to selectively couple input shaft 216 to an intermediate shaft 218 via gearwheel 238, when the second wet clutch is engaged. As used herein, the phrase "selectively coupled" may be intended to mean a connection between two or more elements to allow a torque transfer between the two or more elements based on engagement or disengagement of corresponding clutches.

The intermediate shaft 218 comprises a first wet clutch 232 and a mechanical clutch system 226 (i.e., a dog clutch).

As used herein, the phrases "dog clutch" or "mechanical clutch system" is intended to mean a type of clutch that couples two rotating shafts or other rotating components by engagement of interlocking teeth or "dogs" rather than by friction. The two parts of the clutch are designed such that one will push the other, causing both to rotate at the same speed and therefore potentially reducing or substantially preventing slippage.

The intermediate shaft 218 may be selectively coupled to the input shaft 216 via the second wet clutch 224 as described above or via the first wet clutch 232. For example, the first wet clutch 232 may be selectively coupled to a gearwheel 240 coupled to input shaft 216. Driveline 248 further comprises an idler shaft 220 that may be selectively coupled to the intermediate shaft 218 via a low output 228 of the mechanical clutch system 226 or via a high output 230 of the mechanical clutch system 226. Driveline 248 further comprises an output shaft that may be meshed with idler shaft 220.

In some examples, driveline 248 may optionally comprise a power take off (PTO) output 214 and the third electric motor 206 may be selectively coupled to the gearwheel 236 of input shaft 216 or to the PTO output 214 via a mechanical clutch system 234 (i.e., a disconnect clutch). Power take-offs (PTOs) are mechanical gearboxes that attach to apertures provided in transmissions and, in some examples, may be used to transfer the power of the electric motors to auxiliary components in a vehicle system, such as hydraulic pumps or other components. When engaged, the PTO may provide power, in the form of a rotating shaft, directly to a driven component, for example.

FIG. 2 shows various example geartrains labelled with letters: A, B, C, D, E, F, and G. These geartrains illustrate various functions and capabilities of portions of drivetrain 248. Geartrain A may be used to reduce the input speed from motors 202 and 204. Typically, the driving electro motor can work up to high input speed. To reduce potential negative impacts of internal components rotating too fast, a first speed reducing ratio may be implemented with the input gear train A. The input speed ratio may reduce the input speed coming from the electric motors to reduce issues due to centrifugal forces acting on the internal components of the clutches and may also reduce excessive drag losses in the wet clutches, for example. The transmission system 200 may be used to implement three speeds: first gear, second gear and third gear (described below). The e-efficient powershift transmission with three speeds has several shafts, gears, clutches, and bearings. These components are positioned in such a way that three different speeds become available.

Geartrain B may connect the input shaft 216 with intermediate shaft 218, e.g., via engagement of second clutch 224 with gearwheel 238. Geartrain C may connect input shaft 216 with the first clutch 232. Geartrain D may connect the low path 228 (i.e., the low speed path or low output) of the mechanical clutch system 226 via the idler shaft 220 to the output shaft 222. Geartrain E may connect the high path 230 (i.e., the high speed path or high output) of the mechanical clutch system 226 via the idler shaft 220 to the output shaft 222. The shifting from the first clutch 232 to the second clutch 224 may be a powershift without torque interruption, meaning the torque output by system 200 may not be affected by the powershift so that it is substantially maintained at a desired target torque output level throughout the powershift. Both the first clutch 232 and the second clutch 224 are wet clutches, so shifting from the first clutch 232 to the second clutch 224 is between two wet clutches. However, shifting from second gear to third gear is done via the mechanical clutch system 226 and may cause a torque interruption during the gear shift.

Geartrain F may be used to reduce output speed during certain conditions. For example, in response to road conditions, vehicle operating conditions, driver input and the like, it may be desirable to reduce output speed to meet a target output speed. Geartrain G may be used for PTO connection. As mentioned above, system 200 may optionally include PTO functionality. In some examples, the PTO may be independently used by disconnecting a motor from the drive line, e.g., by disconnecting motor 206 from the driveline and using motor 206 to power the PTO.

In some examples, the three electric motors 202, 204, and 206 may be used to provide power during non-shift operation of the drivetrain, i.e., during operating conditions where no gear change is implemented. The first and second electric motors 202 and 204 may be used during powershifts. In some examples, the third electric motor 206 may be used to support the first and second electric motors 202 and 204 pending ratio changes during gear changes.

At high speeds, shifting may be done by mechanical clutch system 226 as a standard powershift. In some examples, at higher output speeds, the third electric motor 206 may be connected back to the transmission (with or without the PTO still connected). In some examples, third electric motor 206 may be used as an independent PTO motor. If PTO functionality is desired at low output speeds, then third electric motor 206 may be disconnected from the driveline and third electric motor 206 may operate the PTO independent from the output shaft 222 speed. Even with the third electric motor 206 disconnected from the drivetrain, a powershift may still be implemented by using first and second electric motors 202 and 204.

Figure 3A:
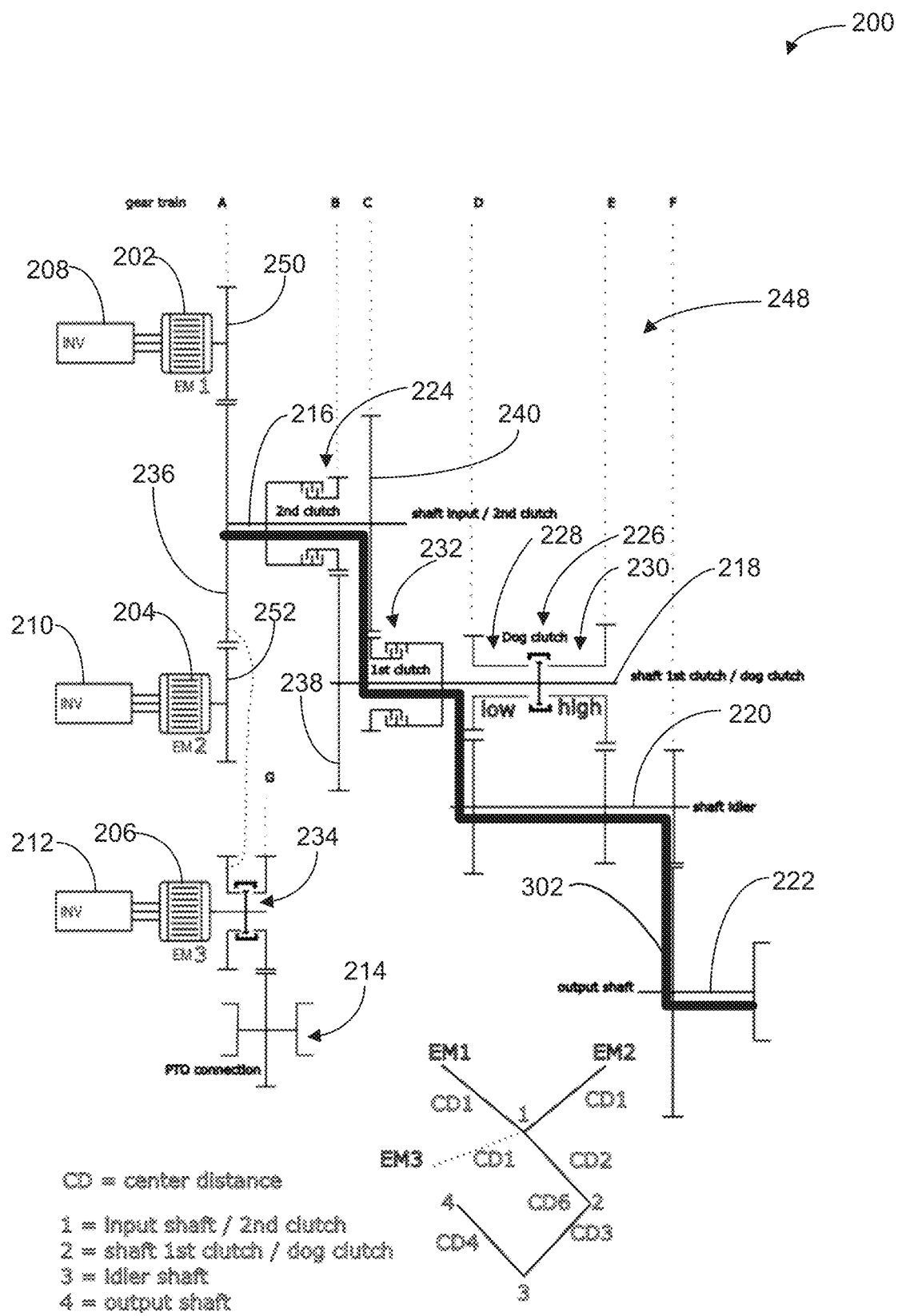
FIGS. 3A-C show example power paths for gear/clutch ratios in accordance with the disclosure.
Figure 3B:
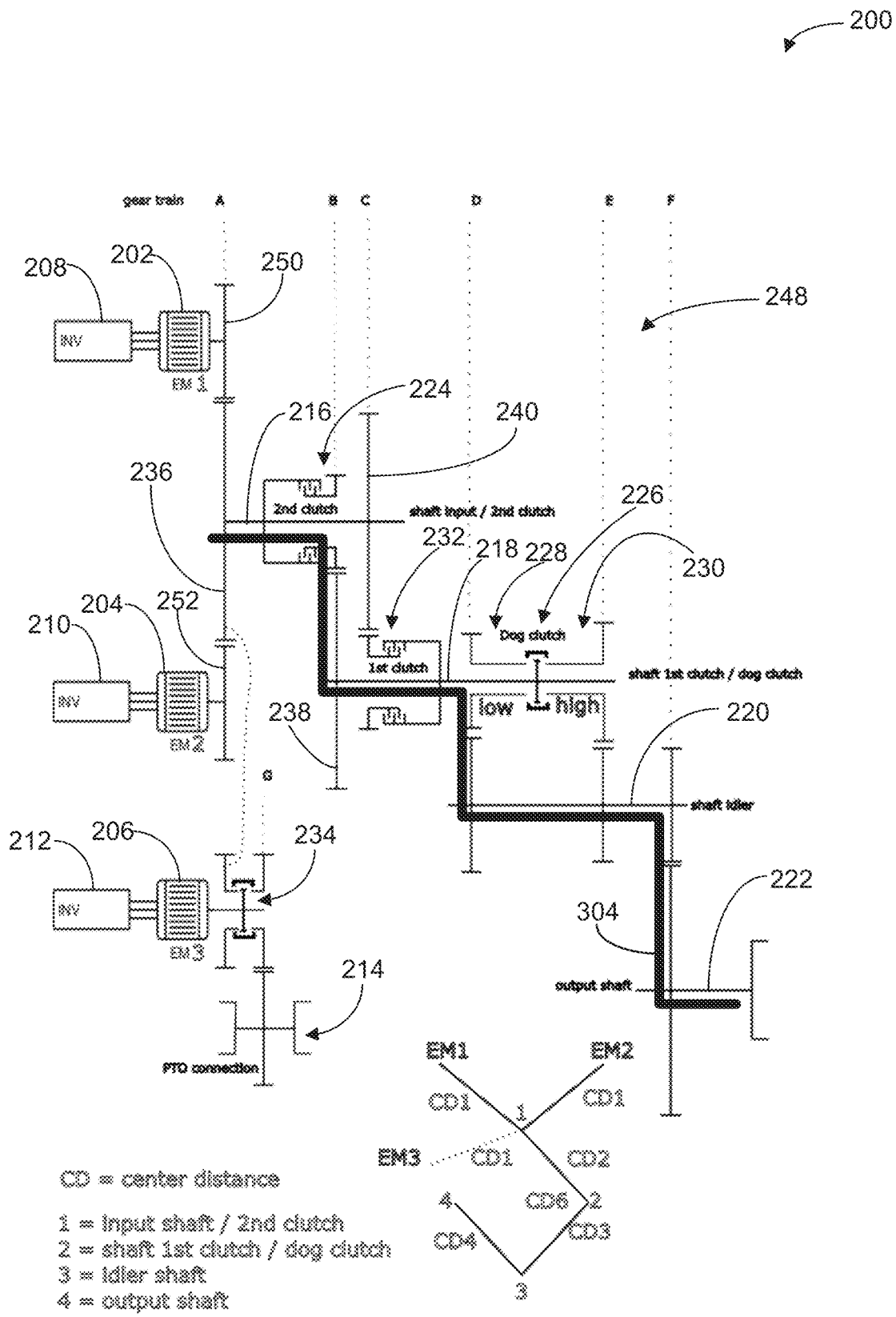
Figure 3C:
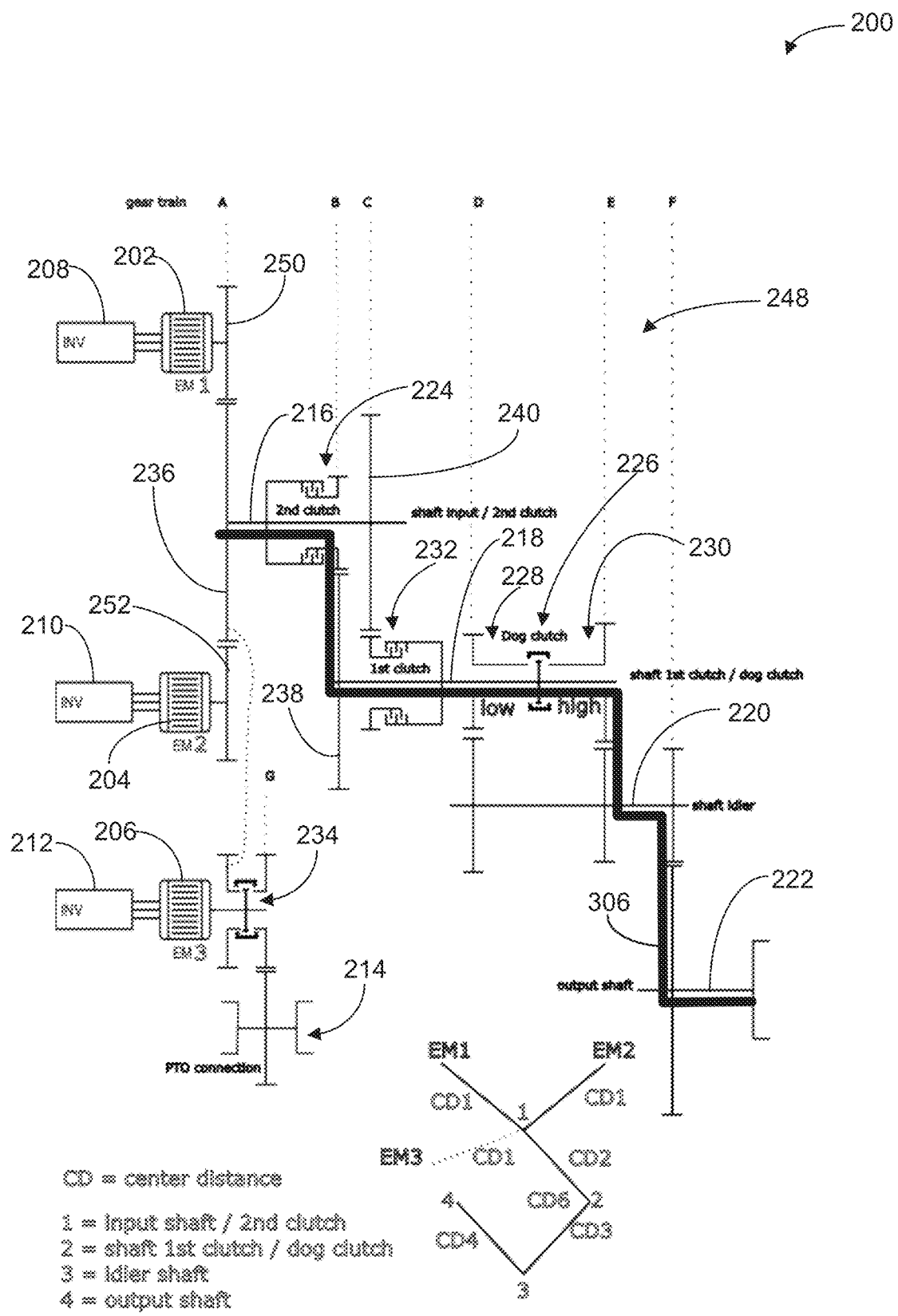

Turning now to FIGS. 3A-C, power paths for each of three gear/clutch ratios for a transmission system are provided. The transmission system depicted in FIGS. 3A-C may be the transmission system 200 shown in FIG. 2 described above, where like numbers correspond to like elements described above. In particular, FIG. 3A shows a power path 302 for a first gear where the first clutch 232 is engaged and the low path 228 is taken with mechanical clutch system 226. FIG. 3B shows a power path 304 for a second gear where the second clutch 224 is engaged and the low path 228 is taken with mechanical clutch system 226. FIG. 3C shows a power path 306 for a third gear where the second clutch 224 is engaged and the high path 230 is taken with mechanical clutch system 226.

Changes in the gear/clutch ratios may be implemented in response to various conditions and may be applicable to a variety of road conditions, driver inputs, and other vehicle operating parameters. For example, the vehicle tractive effort in first gear may be very demanding as applications might be implemented in severe environmental conditions, such as muddy road conditions, steep slopes or inclines, and the like. If the high tractive effort in first gear is not needed to start moving the vehicle one can start with the transmission in second gear depending on the driver's choice and the controller settings. The combo of a wet clutch powershift and mechanical clutch system shift results in a more efficient and cost effective transmission while providing an uninterrupted shift between first and second gears and a shift with torque interrupt between second and third gears.

Figure 4:
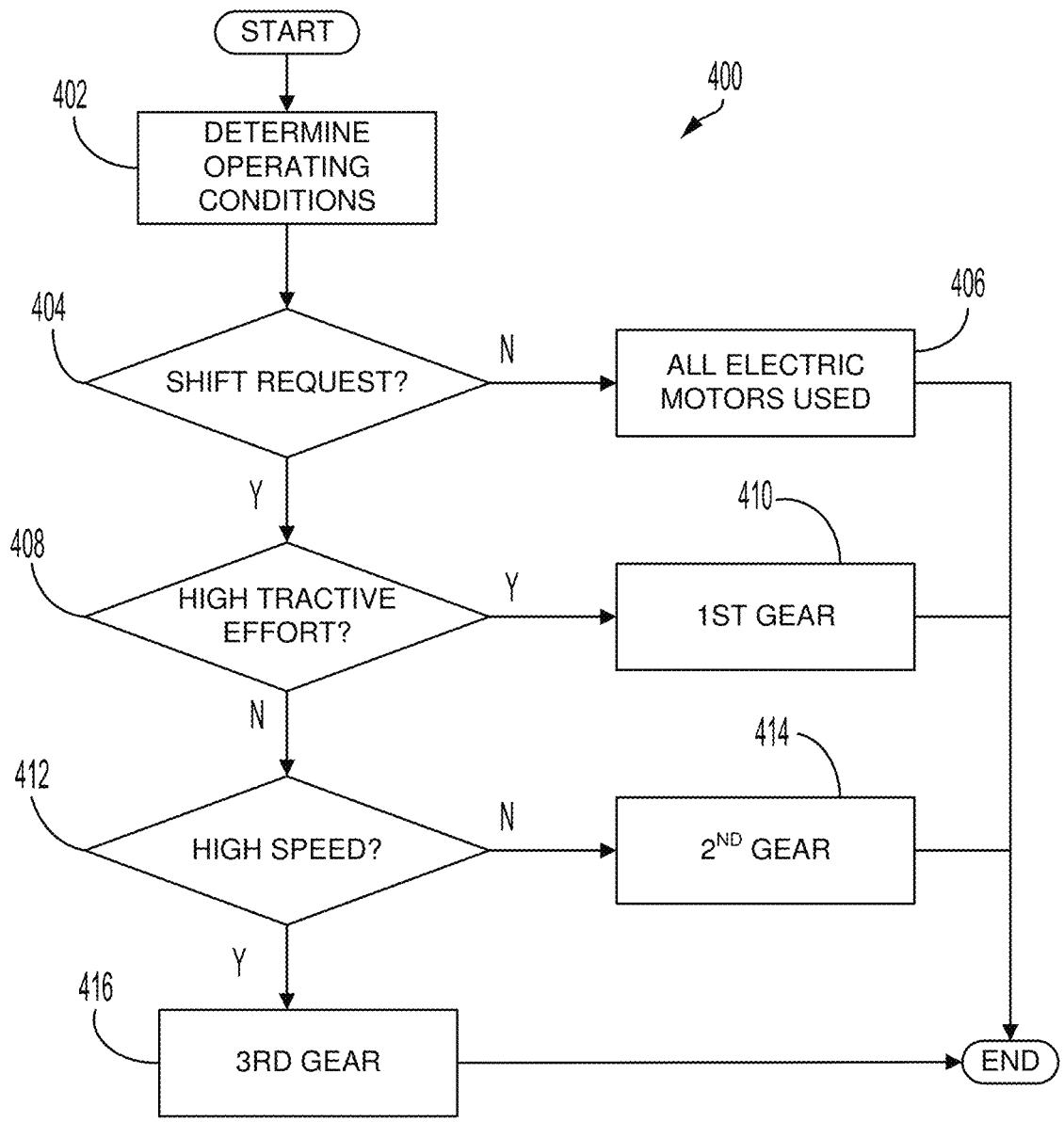
FIG. 4 shows an example method of operating a transmission in accordance with the disclosure.

FIG. 4 shows an example method 400 of operating a transmission in accordance with the disclosure. For example, method 400 may be implemented for transmission system 200 shown in FIG. 2 to selectively change gears and other operating conditions during operation of a vehicle. Method 400 may comprise selective engagement of one or more clutches to transition or transform an operating mode of the transmission. Method 400 may be at least partially implemented as executable instructions stored in controller memory in the system of FIG. 2, for example. Further method 400 may include actions taken in the physical world to transform the operating mode of the system of FIG. 2. Additionally, method 400 may provide at least some of the operating modes shown in FIGS. 3A-C described above.

At 402, method 400 includes determining operating conditions. Vehicle operating conditions may include, but are not limited to: PTO engagement, electric motor drive modes, number of electric motors in operation and/or contributing torque/power to outputs or other vehicle devices, transmission operating gear ratios, clutch states, driver inputs, etc. In some examples, the vehicle operating conditions may be determined from various sensors included in the vehicle and/or may be based on driver inputs.

At 404, method 400 includes determining if a gear shift is requested. For example, a drive may provide input to change vehicle operating conditions such as increasing/decreasing tractive effort, increasing/decreasing vehicle speed, implementing idling conditions, etc. In some examples, various sensors included in the vehicle system may be used to determine whether or not to implement a gear shift without or in addition to driver inputs.

If a gear shift is not requested at 404, method 400 may optionally proceed to 406 to use all three electric motors: first, second, and third electric motors 202, 204, and 206. In this way, three electric motors may provide output power during non-shift operation of the transmission. For example, third electric motor 206 may be rotationally coupled with gearwheel 236 shown in FIG. 2.

If a gear shift is requested at 404, method 400 proceeds to 408 to determine if high tractive effort conditions are met. Determining if high tractive effort conditions are met may be based on driver inputs, wheel speed and/or torque, road conditions and the like. For example, if the vehicle is driving on a steep slope, a driver may request an increase in tractive effort. As another example, one or more sensors may be used to determine if an amount of force to drive wheels of the vehicle is greater than a threshold value, thereby indicating that high tractive effort conditions are met.

If high tractive effort conditions are met at 408, method 400 proceeds to 410 to operate the transmission in first gear where the first clutch 232 is engaged and the low path 228 is taken with mechanical clutch system 226, as shown in the power path 302 in FIG. 3A. As remarked above, vehicle tractive effort in first gear may be very demanding as applications might need to be able to work in severe environmental conditions (mud, steep slopes). If the high tractive effort in first gear is not needed to start moving the vehicle one can start with the transmission in second gear (shown in FIG. 3B) depending on the driver's choice and the controller settings.

If high tractive conditions are not met at 408, method 400 proceeds to 412 to determine if high speed conditions are met. Determining if high speed conditions are met may be based on driver inputs, for example. If high speed conditions are not met at 412, method 400 proceeds to 414 to operate the transmission in second gear where the second clutch 224 is engaged and the low path 228 is taken with mechanical clutch system 226, as shown in power path 304 in FIG. 3B. At high speeds, shifting may be performed by the mechanical clutch system as a standard (non) powershift. In some examples, at least one powershifting transient may be utilized while selective engagement and disengagement of clutches is performed (e.g., when shifting from one gear to another). The powershifting transient may entail decreasing/ increasing electric motor speed and torque while engaging/ disengaging relevant clutches, for example.

If high speed conditions are met at 412, method 400 proceeds to 416 to operate the transmission in third gear where the second clutch 224 is engaged and the high path 230 is taken with mechanical clutch system 226, as shown in power path 306 in FIG. 3C.

Figure 5:
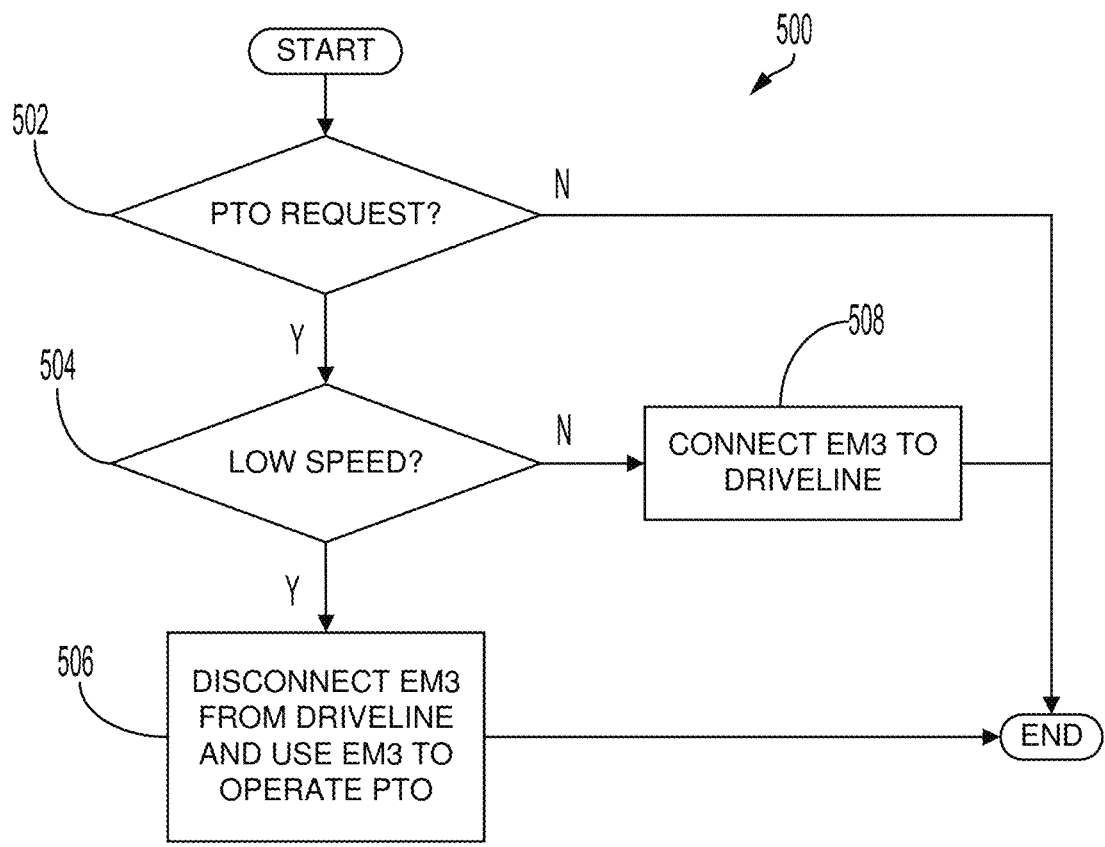
FIG. 5 shows an example method of operating a PTO system in accordance with the disclosure.

FIG. 5 shows an example method 500 of operating a PTO system, such as PTO connection 214 shown in FIG. 2. At 502, method 500 includes determining if a PTO request occurs. Determining if a PTO request occurs may be based on driver input and/or various vehicle operating conditions. If a PTO request occurs at 502, method 500 proceeds to 504 to determine if low speed conditions are met. Determining if low speed conditions are met may be based on driver inputs, for example. If low speed conditions are met at 504, method 500 proceeds to 506 to disconnect the third electric motor 234 from the driveline and operate the PTO with third electric motor 206 independently of the output shaft speed. During this condition, even if third electric motor 206 is disconnected from the drivetrain, a powershift may still be implemented by using first and second electric motors, 202 and 204. If low speed conditions are not met at 504, method 500 proceeds to 508 to connect the third electric motor 206 to the driveline. In this way, at higher output speeds, third electric motor 206 can be connected back to the transmission (with or without the PTO still connected).

Various non-limiting embodiments are also described in the following. In some embodiments a transmission system is provided that comprises an input shaft rotationally coupled with a first electric motor and a second electric motor, the input shaft having a second clutch; an intermediate shaft having a first clutch and a mechanical clutch system, where the intermediate shaft is selectively coupled to the input shaft via the second clutch or via the first clutch; an idler shaft selectively coupled to the intermediate shaft via a low output of the mechanical clutch system or via a high output of the mechanical clutch system; and an output shaft rotationally coupled with the idler shaft.

In some examples, such a transmission system may further comprise a third electric motor selectively coupled to the input shaft or to a power takeoff output via a mechanical clutch system. In some examples the first, second, and third electric motors may be traction motor-generators and the first clutch and second clutch may be wet clutches.

In some embodiments of the disclosed transmission system, the input shaft may be rotationally coupled with the first electric motor and the second electric motor via a gearwheel. The intermediate shaft may be selectively coupled to the input shaft via the second clutch or via the first clutch via gearwheels, and the output shaft may be rotationally coupled with the idler shaft via a gearwheel.

In some examples, such transmission systems may be configured to implement a first gear wherein the first clutch rotationally couples the input shaft with the intermediate shaft and the low output of the mechanical clutch system rotationally couples the idler shaft with the intermediate shaft. Embodiments of the transmission system may be configured to implement a second gear wherein the second clutch rotationally couples the input shaft with the intermediate shaft and the low output of the mechanical clutch system rotationally couples the idler shaft with the intermediate shaft. As another example, the transmission system may be configured to implement a third gear wherein the second clutch rotationally couples the input shaft with the intermediate shaft and the high output of the mechanical clutch system rotationally couples the idler shaft with the intermediate shaft.

In some embodiments, the disclosed transmission system may be for an electric vehicle and may comprise an input shaft rotationally coupled via a gearwheel with a first electric motor and a second electric motor, the input shaft having a second wet clutch; an intermediate shaft having a first wet clutch and a mechanical clutch system, where the intermediate shaft is selectively coupled to the input shaft via the second wet clutch or via the first wet clutch via gearwheels; an idler shaft selectively coupled to the intermediate shaft via a low output of the mechanical clutch system or via a high output of the mechanical clutch system; and an output shaft rotationally coupled with the idler shaft via a gearwheel.

In some examples, the disclosed transmission systems for electric vehicles may further comprising a third electric motor selectively coupled to a gearwheel of the input shaft or to a power takeoff output via a mechanical clutch system. The first, second, and third electric motors may be traction motor-generators.

Various methods for operating such transmission systems are provided. In one example, a method for operating a transmission system having first, second and third electric motors, may comprise: during a first condition, operating the transmission system in a first gear, wherein a first wet clutch rotationally couples an input shaft with an intermediate shaft and a low output of a mechanical clutch system rotationally couples an idler shaft with the intermediate shaft; during a second condition, operating the transmission system in a second gear, wherein a second wet clutch rotationally couples the input shaft with the intermediate shaft and the low output of the mechanical clutch system rotationally couples the idler shaft with the intermediate shaft; and during a third condition, operating the transmission system in a third gear, wherein the second wet clutch rotationally couples the input shaft with the intermediate shaft and a high output of the mechanical clutch system rotationally couples the idler shaft with the intermediate shaft.

In some examples, the first condition may be a high tractive effort low speed condition, the second condition may be a medium tractive effort medium speed condition, and the third condition may be a low tractive effort high speed condition. In examples, such methods may further comprise during a low speed condition, disconnecting the third electric motor from the input shaft and providing power to a power takeoff with the third electric motor. In examples, such methods may further comprise: during a high speed condition, connecting or maintaining connection of the third electric motor with the input shaft and providing power to the input shaft with the first, second and third electric motors While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:
    an input shaft rotationally coupled with a first electric motor and a second electric motor, the input shaft having a second clutch;
    an intermediate shaft having a first clutch and a mechanical clutch system, where the intermediate shaft is selectively coupled to the input shaft via the second clutch or via the first clutch;
    an idler shaft selectively coupled to the intermediate shaft via a low output of the mechanical clutch system or via a high output of the mechanical clutch system; and
    an output shaft rotationally coupled with the idler shaft.

2. The transmission system of claim 1, further comprising a third electric motor selectively coupled to the input shaft or to a power takeoff output via a mechanical clutch system.

3. The transmission system of claim 2, wherein the first, second, and third electric motors are traction motor-generators.

4. The transmission system of claim 1, wherein the first clutch and second clutch are wet clutches.

5. The transmission system of claim 1, wherein the input shaft is rotationally coupled with the first electric motor and the second electric motor via a gearwheel.

6. The transmission system of claim 1, wherein the intermediate shaft is selectively coupled to the input shaft via the second clutch or via the first clutch via gearwheels.

7. The transmission system of claim 1, wherein the output shaft is rotationally coupled with the idler shaft via a gearwheel.

8. The transmission system of claim 1, further comprising a third electric motor selectively coupled to a gearwheel of the input shaft or to a power takeoff output via a mechanical clutch system.

9. The transmission system of claim 1, wherein the transmission system is configured to implement a second gear wherein the second clutch rotationally couples the input shaft with the intermediate shaft and the low output of the mechanical clutch system rotationally couples the idler shaft with the intermediate shaft.

10. The transmission system of claim 1, wherein the transmission system is configured to implement a third gear wherein the second clutch rotationally couples the input shaft with the intermediate shaft and the high output of the mechanical clutch system rotationally couples the idler shaft with the intermediate shaft.

11. The transmission system of claim 1, wherein the transmission system is configured to implement a first gear wherein the first clutch rotationally couples the input shaft with the intermediate shaft and the low output of the mechanical clutch system rotationally couples the idler shaft with the intermediate shaft.

12. The transmission system of claim 11, wherein the first, second, and third electric motors are traction motor-generators.

13. The transmission system of claim 11, wherein the transmission system is configured to implement a first gear wherein the first wet clutch rotationally couples the input shaft with the intermediate shaft and the low output of the mechanical clutch system rotationally couples the idler shaft with the intermediate shaft.

14. The transmission system of claim 11, wherein the transmission system is configured to implement a second gear wherein a second wet clutch rotationally couples the input shaft with the intermediate shaft and the low output of the mechanical clutch system rotationally couples the idler shaft with the intermediate shaft.

15. The transmission system of claim 11, wherein the transmission system is configured to implement a third gear wherein the second wet clutch rotationally couples the input shaft with the intermediate shaft and the high output of the mechanical clutch system rotationally couples the idler shaft with the intermediate shaft.

16. A transmission system for an electric vehicle, comprising:
    an input shaft rotationally coupled via a gearwheel with a first electric motor and a second electric motor, the input shaft having a second wet clutch;
    an intermediate shaft having a first wet clutch and a mechanical clutch system, where the intermediate shaft is selectively coupled to the input shaft via the second wet clutch or via a first wet clutch via gearwheels;
    an idler shaft selectively coupled to the intermediate shaft via a low output of the mechanical clutch system or via a high output of the mechanical clutch system; and an output shaft rotationally coupled with the idler shaft via a gearwheel.

\* \* \* \* \*